United States Patent
Kogawa (10) Patent No.: US 8,204,940 B2
(45) Date of Patent: Jun. 19, 2012

(54) MOBILE COMMUNICATION TERMINAL AND MOBILE COMMUNICATION SYSTEM

(75) Inventor: Ryutaro Kogawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1503 days.

(21) Appl. No.: 11/052,758

(22) Filed: Feb. 9, 2005

(65) Prior Publication Data

US 2005/0181769 A1    Aug. 18, 2005

(30) Foreign Application Priority Data

Feb. 17, 2004    (JP) .................................. 2004/39854

(51) Int. Cl.
*G06F 15/16* (2006.01)

(52) U.S. Cl. ........ 709/206; 709/203; 709/205; 709/207; 709/217

(58) Field of Classification Search .................. 709/206, 709/203, 205, 207, 217
See application file for complete search history.

(56) References Cited

U.S. PATENT DOCUMENTS

| | | | | |
|---|---|---|---|---|
| 5,493,692 | A  * | 2/1996 | Theimer et al. | 455/26.1 |
| 5,958,005 | A  * | 9/1999 | Thorne et al. | 709/202 |
| 6,639,608 | B1 * | 10/2003 | Itakura | 715/738 |
| 6,643,684 | B1 | 11/2003 | Malkin et al. | |
| 6,721,784 | B1 * | 4/2004 | Leonard et al. | 709/206 |
| 6,757,713 | B1 * | 6/2004 | Ogilvie et al. | 709/206 |
| 7,149,893 | B1 * | 12/2006 | Leonard et al. | 713/154 |
| 7,228,334 | B1 * | 6/2007 | Jordan, Jr. | 709/206 |
| 7,356,616 | B2 * | 4/2008 | Kaler et al. | 709/246 |
| 7,376,705 | B2 * | 5/2008 | Nagai et al. | 709/206 |
| 2001/0005855 | A1 * | 6/2001 | Shaw et al. | 709/206 |
| 2002/0025853 | A1 * | 2/2002 | Kojima et al. | 463/42 |
| 2002/0026490 | A1 * | 2/2002 | Okamura | 709/206 |
| 2002/0075291 | A1 * | 6/2002 | Van Gestel et al. | 345/700 |
| 2003/0067464 | A1 * | 4/2003 | Gathman et al. | 345/440 |
| 2003/0088523 | A1 * | 5/2003 | Yui | 705/400 |
| 2003/0131060 | A1 * | 7/2003 | Hartselle et al. | 709/206 |
| 2004/0013243 | A1 * | 1/2004 | Harris | 379/67.1 |
| 2004/0064704 | A1 * | 4/2004 | Rahman | 713/182 |
| 2004/0075701 | A1 * | 4/2004 | Ng | 345/867 |
| 2004/0097218 | A1 * | 5/2004 | Vossler | 455/418 |
| 2004/0111477 | A1 * | 6/2004 | Boss et al. | 709/206 |
| 2004/0145660 | A1 * | 7/2004 | Kusaka | 348/211.2 |
| 2004/0196866 | A1 * | 10/2004 | Park et al. | 370/466 |

(Continued)

FOREIGN PATENT DOCUMENTS

EP    1 111 883 A2    6/2001

(Continued)

OTHER PUBLICATIONS

"OS/2 Office: Delayed Delivery for Mail Items"; IBM Technical Disclosure Bulletin, vol. 34, No. 9, Feb. 1992, p. 381-382, IBM Corp., Armonk, New York, USA.

*Primary Examiner* — Karen Tang (74) *Attorney, Agent, or Firm* — Dickstein Shapiro LLP (57) ABSTRACT

When sending electronic mail, a user of a mobile phone can add predetermined conditions (or data) to the electronic mail. When the mobile phone receives electronic mail with the conditions added thereto, the received electronic mail can be displayed and deleted according to the aforementioned conditions. The receiver of the electronic mail cannot freely dispose of the received electronic mail. The added conditions are, for example, display date and time, display period, number of displays, retention period.

15 Claims, 7 Drawing Sheets

U.S. PATENT DOCUMENTS

| | | | |
|---|---|---|---|
| 2004/0201616 A1* | 10/2004 | Itakura et al. | 345/738 |
| 2004/0210587 A1* | 10/2004 | Reysa | 707/100 |
| 2011/0161432 A1* | 6/2011 | Ellanti | 709/206 |

FOREIGN PATENT DOCUMENTS

| | | | |
|---|---|---|---|
| EP | 1617359 | * | 12/2004 |
| EP | 1 617 359 A1 | | 1/2006 |
| EP | 1111883 | * | 6/2006 |
| JP | 11-085624 A | | 3/1986 |
| JP | 11-500874 A | | 1/1999 |
| JP | 2000-078308 A | | 3/2000 |
| JP | 2000-124942 A | | 4/2000 |
| JP | 2002-169737 A | | 6/2002 |
| JP | 2003-099351 A | | 4/2003 |
| JP | 2003-141017 A | | 5/2003 |
| JP | 2003-141039 | | 5/2003 |
| JP | 2003-256343 | | 9/2003 |
| JP | 2003-296623 A | | 10/2003 |
| WO | WO-02/09460 A1 | | 1/2002 |
| WO | WO 2005107290 | * | 4/2004 |
| WO | WO-2005/107290 A1 | | 11/2005 |

* cited by examiner

FIG.1

PRIOR ART

MOBILE COMMUNICATION TERMINAL AND MOBILE COMMUNICATION SYSTEM

BACKGROUND OF THE INVENTION

1. Field of the Invention

The present invention relates to a mobile communication terminal, and specifically relates to a mobile communication terminal sending and receiving electronic mail.

2. Description of the Related Art

Figure 1:
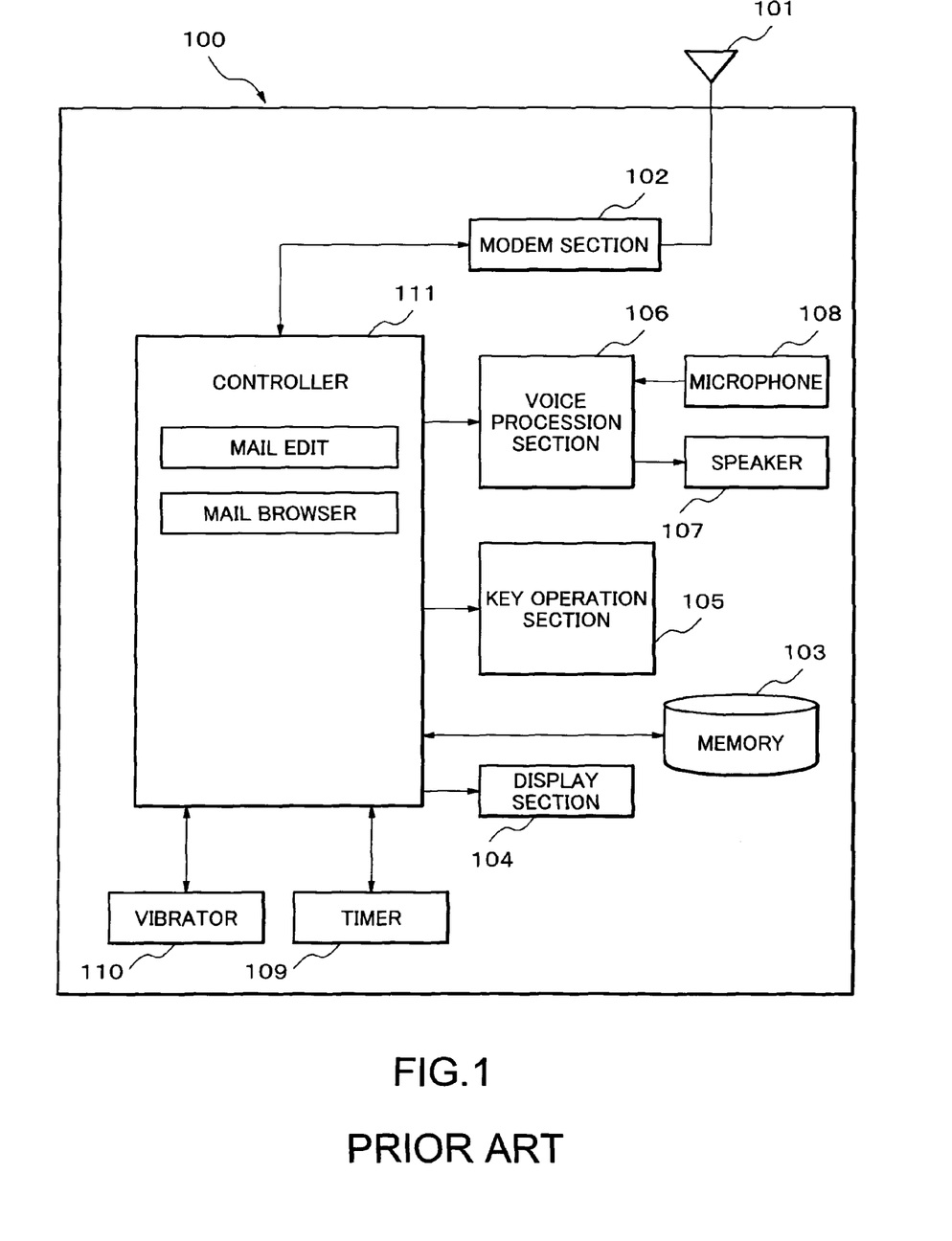
FIG. 1 is a block diagram of a conventional mobile phone.

In recent years, a mobile communication terminal, such as a mobile phone, has been increasingly used as a tool sending and receiving electronic mail. As shown in FIG. 1, a typical mobile phone 100 includes an antenna 101, a modem section 102, a memory 103, a display section 104, a key operation section 105, a voice processing section 106, a speaker 107, a microphone 108, a timer 109, a vibrator 110, and a controller 111. The controller 111 is a CPU and controls operations of the entire mobile phone 100. The controller 111 includes a mail edit function and a mail browser function. An operator can create a mail document through the key operation section 105 and send the electronic mail to the party at the other end. On the other hand, a receiver of the electronic mail can hold the received electronic mail in a predetermined memory. Thereafter, the receiver can freely browse, save, and forward the electronic mail. The sender of the electronic mail usually cannot freely control the electronic mail once it is sent.

On the other hand, the Japanese Patent Laid-Open publication No. 2003-256343 discloses an electronic mail system in which a mail sender can determine whether or not a piece of electronic mail received by a receiver can be saved. The mail sender can add to electronic mail to be sent a condition that saving is disabled. The electronic mail with this condition added thereto is stored in an electronic mail server. The mail is forcibly deleted once the other party browses this electronic mail. The Japanese Patent Laid-Open publication No. 2003-141039 discloses an electronic mail system in which an electronic mail sender can specify delivery date and time of electronic mail, send the electronic mail, and check and modify the contents of the mail before the specified date and time. The sent electronic mail is stored in an electronic mail server on the Internet and delivered to a specified mail address at the specified date and time. The electronic mail sender can access the electronic mail server before the delivery date and time and modify and store the electronic mail again in the server.

In the aforementioned electronic mail systems, the electronic mail stored in the electronic mail server can be controlled to some extent according to the condition added by the sender. However, after the electronic mail is stored in the receiver's mobile phone, the sender cannot manage or control the electronic mail in the receiver's mobile phone. The electronic mail receiver can freely dispose of the received electronic mail.

SUMMARY OF THE INVENTION

A mobile communication terminal according to the present invention sends and receives electronic mail. The terminal includes attaching means and electronic mail managing means. The data attaching means attaches to electronic mail to be sent management data for the electronic mail. The electronic mail managing means manages received electronic mail according to the management data attached to the received electronic mail. A mobile communication system according to the present invention includes a plurality of mobile communication terminals, a base station, and a mobile communication network. Each of the mobile communication terminals includes attaching means attaching to electronic mail to be sent management data for the mail; and electronic mail managing means managing received electronic mail according to data attached to the received mail.

In the aforementioned invention, the electronic mail sender can manage or control sent electronic mail in predetermined processing even after the electronic mail has been saved in a receiver's terminal.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 2:
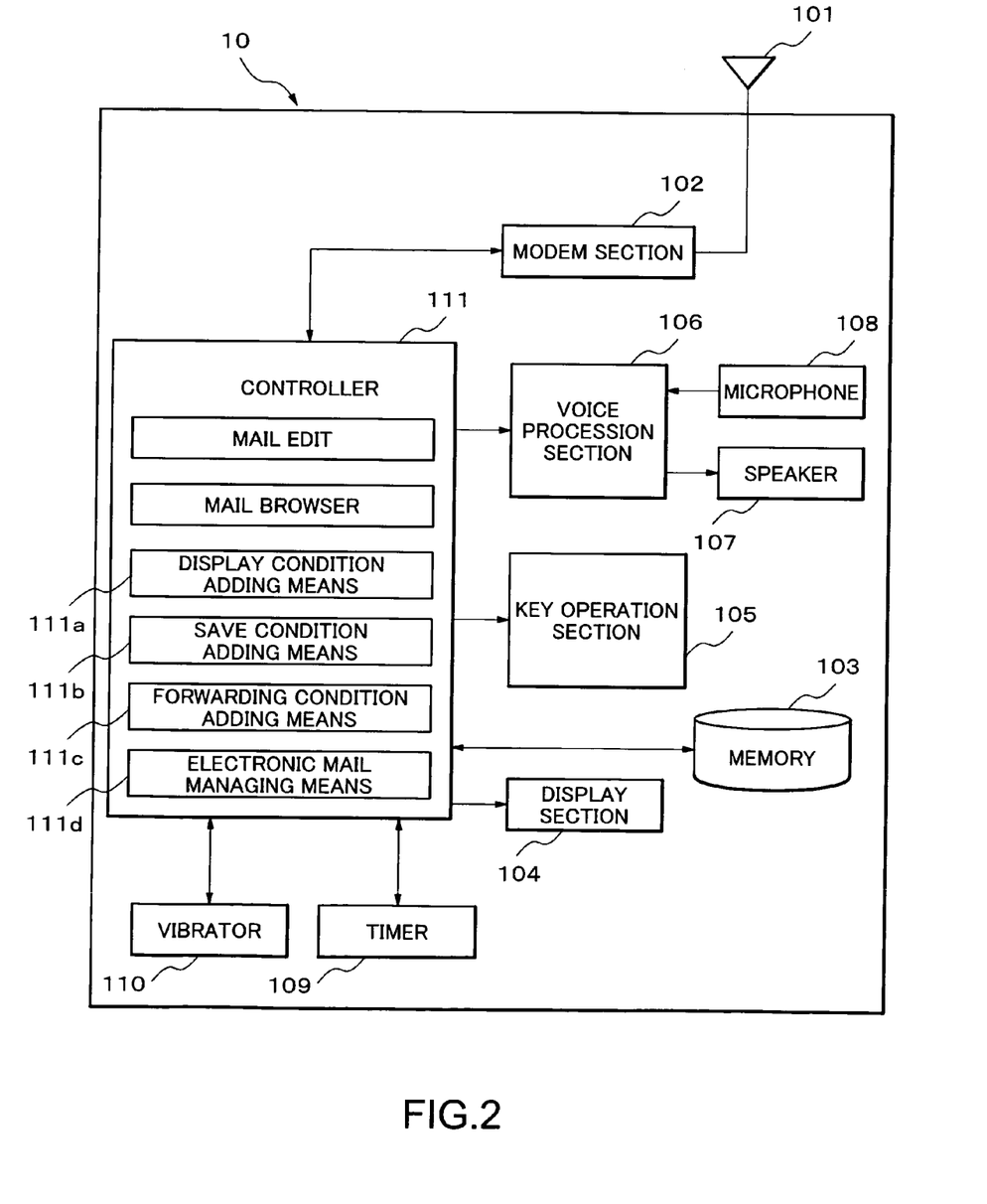
FIG. 2 is a block diagram of a mobile phone of an embodiment of the present invention.

Hereinafter, a description is given to an example of a mobile phone as a preferred embodiment of a mobile communication terminal of the present invention. A mobile phone 10 exemplified in FIG. 2 basically includes the same configuration and functions as those of the conventional mobile phone, 100 shown in FIG. 1. Specifically, the mobile phone 10 includes a voice call function, a mail send/receive function, a mail edit function, and a mail browser function. As shown in FIG. 2, a controller 111 of the mobile phone 10 further includes display condition adding means 111a, saving condition adding means 111b, forwarding condition adding means 111c, and electronic mail managing means 111d. The controller 111 executes programs stored in a memory 103 to implement predetermined functions. The programs can be installed in advance. An operator can download a necessary program from the Internet. The aforementioned condition adding means 111a, 111b, and 111c add individual predetermined conditions to electronic mail to be sent according to entries by the operator. The electronic mail received by the other party is managed according to the added conditions. The electronic mail managing unit 111d periodically checks the contents of operations executed for the received electronic mail, the number of times of the operations, an electronic mail retention period, and others. The electronic mail managing unit 111d, for example, deletes the received mail or adds a predetermined restriction thereto according to the added conditions.

Figure 3:
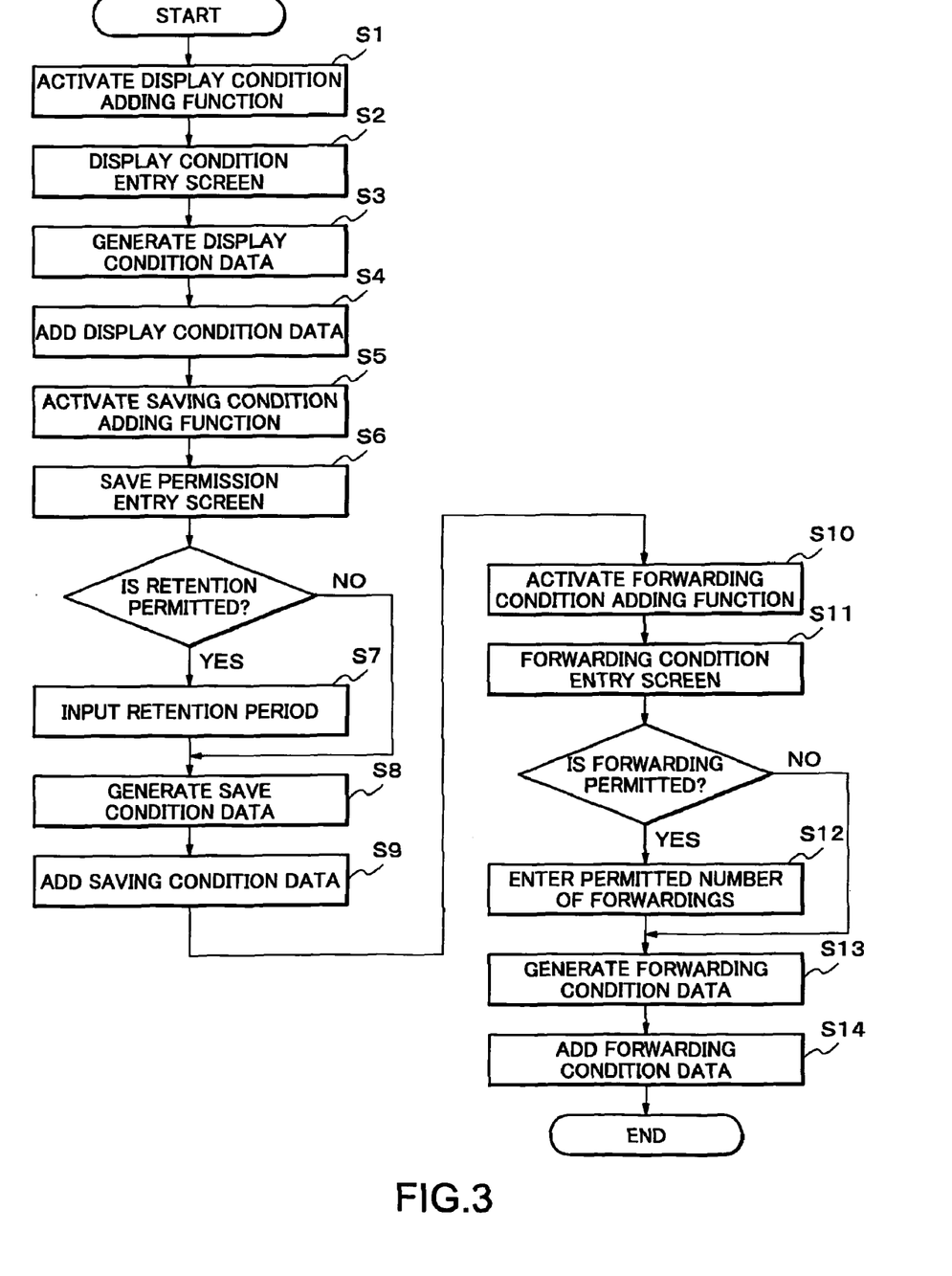
FIG. 3 is an example of an operation when the mobile phone of the embodiment of the present invention sends electronic mail.

Referring to FIG. 3, an example of an operation of the mobile phone 10 sending electronic mail is shown. When an operator sends electronic mail, the display condition adding means 111a, saving condition adding means 111b, and forwarding condition adding means 111c in the controller 111 mainly function. When the electronic mail sender (operator) performs a predetermined operation including, for example, the pressing of a predetermined key of the key operation section 105 and the clicking of a predetermined icon on the display section 104, the display condition adding function is activated (S1). Subsequently, a display condition entry screen appears on the display section 104 (S2). This screen includes a window for entry of a date and time when the electronic mail is permitted to be displayed (hereinafter, referred to as a display date and time) and/or the number of times the electronic mail is permitted to be displayed (hereinafter, referred to as the number of displays permitted (or allowed)). The electronic mail sender operates the key operation section 105 and enters desired data concerning the aforementioned conditions. The controller 111 generates data of the entered display conditions (S3) and adds the data to electronic mail (S4). When the sender then performs a predetermined operation, the saving condition adding function is activated (S5). Subsequently, a saving condition entry screen appears on the display section 104 (S6). The sender can enter on this screen whether to permit the saving of the electronic mail browsed by the other party. When the sender does not permit the saving of the electronic mail, such a condition is added to the electronic mail. When the electronic mail is permitted to be saved, the sender inputs a period during which the electronic mail is permitted to be retained (hereinafter, referred to as a retention period) (S7). The controller 111 then generates data of the entered saving condition (S8) and adds the data to the generated electronic mail (S9). Subsequently, the sender performs another predetermined operation, and the forwarding condition adding function is activated (S10). A forwarding condition entry screen then appears on the display section 104 (S11). The sender can enter on this screen whether to permit the forwarding of the electronic mail browsed by the other party. When the sender does not permit the electronic mail to be forwarded, data of such a condition is created and added to the electronic mail. When the forwarding of the electronic mail is permitted, the sender enters the number of times the electronic mail is permitted to be forwarded (hereinafter, referred to as the number of forwardings permitted (or allowed)) (S12). The controller 111 then generates data of the entered forwarding condition (S13) and adds the data to the electronic mail (S14).

When the mobile phone on the receiving side can use, for example, a global positioning system, the electronic mail sender can specify and enter a place where the received electronic mail can be displayed. In this case, the sender can add data concerning the place where the mobile phone on the receiving side can display the received electronic mail (data of the latitude and longitude, coordinate data on a map, or the like) to the electronic mail and can send the same.

The aforementioned display condition is, for example, the display date and time and the number of displays permitted. The sender can directly enter a date and time and the number of times and, in addition, can select desired data from dates and times or the numbers of time displayed in pull-down menus. Furthermore, the sender can select a desired date from a calendar in a sub-window. The display condition includes a period during which the electronic mail can be displayed (hereinafter, referred to as a display period). It is possible to enter a plurality of display dates and times. The aforementioned saving condition is the period during which the electronic mail can be retained. The sender can specify a predetermined retention period. Furthermore, the sender can specify the retention period, for example, in a form of one week after the reception date or one hour from the display time. The sender can specify the end of the retention period. When the sender permits the forwarding of the electronic mail and does not enter the number of times, the receiver can freely forward the electronic mail. The order of entering the aforementioned display conditions can be freely changed. Among the aforementioned conditions, any one or two conditions can be set.

Figure 4:
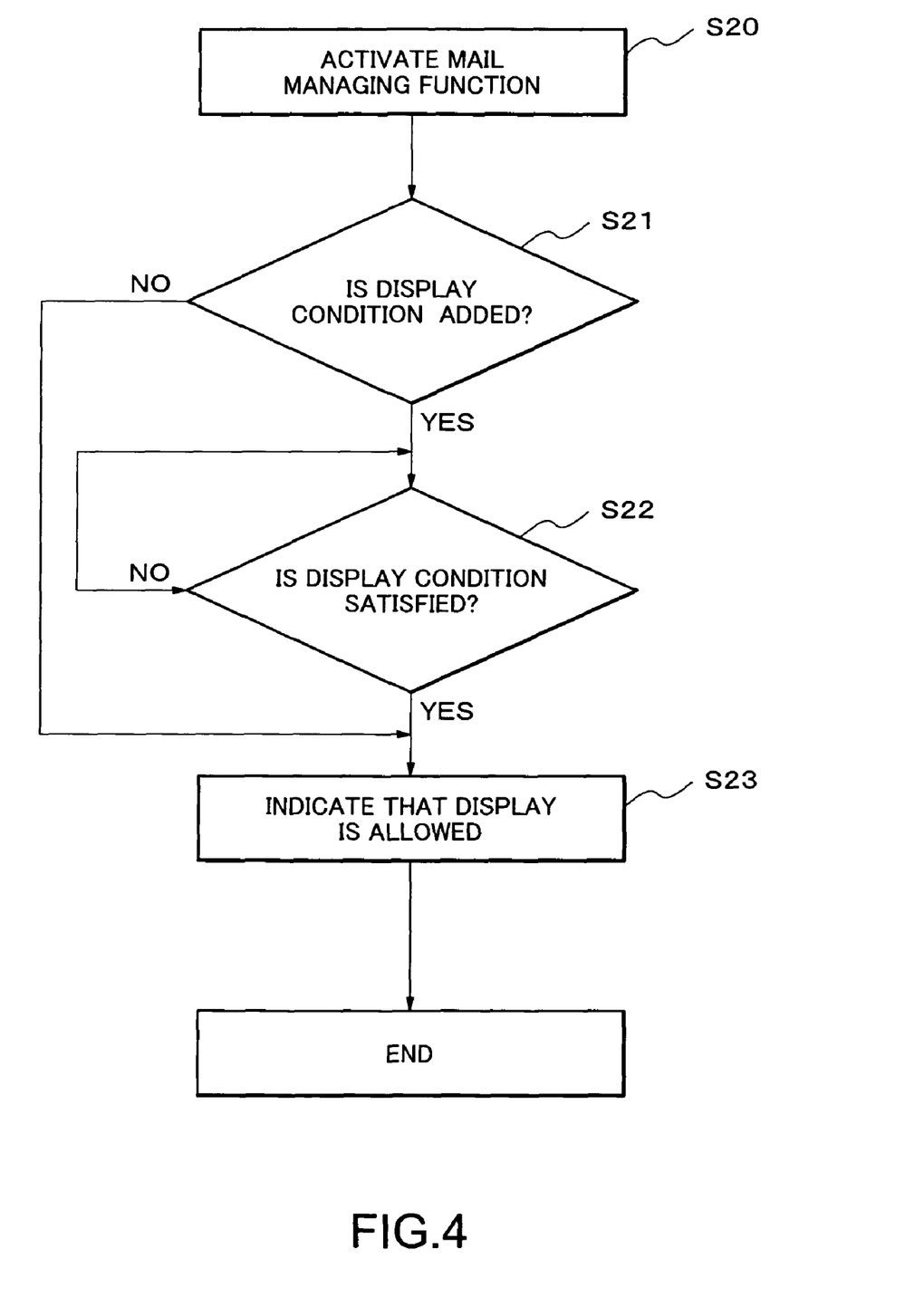
FIG. 4 is an example of an operation after the mobile phone of the embodiment of the present invention receives electronic mail.
Figure 5:
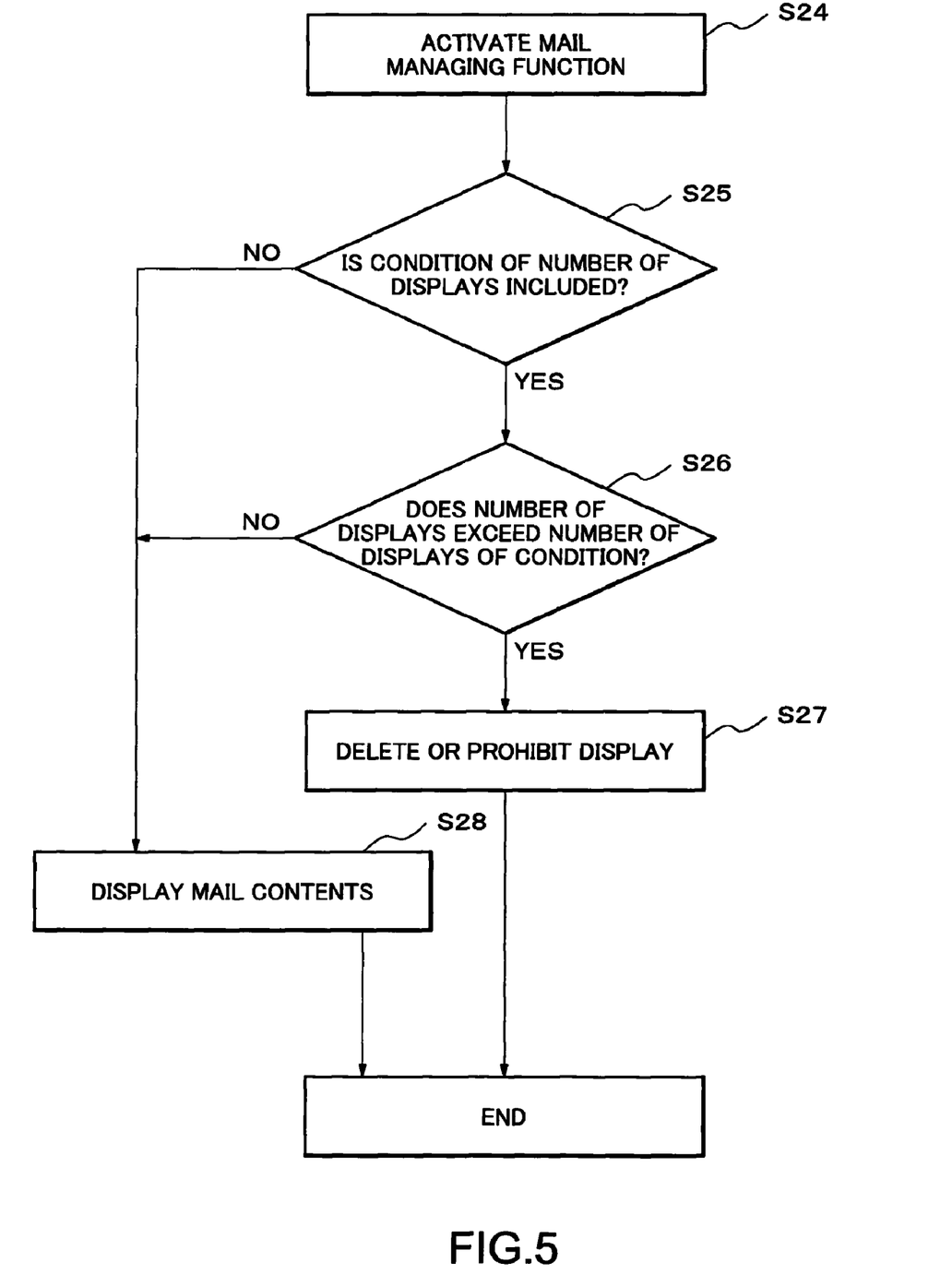
FIG. 5 is an example of an operation after the mobile phone of the embodiment of the present invention receives electronic mail.
Figure 6:
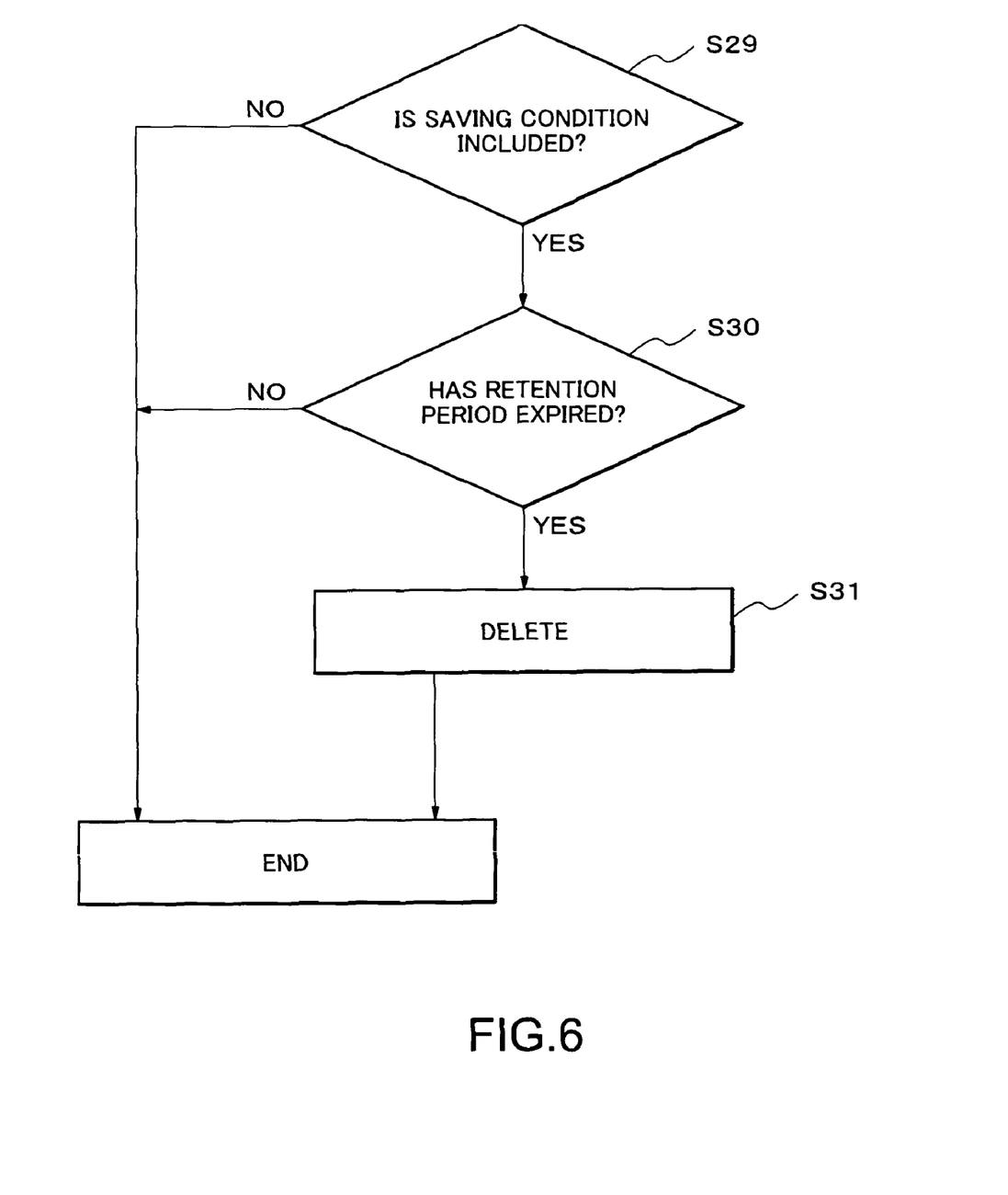
FIG. 6 is an example of an operation after the mobile phone of the embodiment of the present invention receives electronic mail.

Next, FIGS. 4 to 6 show operation examples when the mobile phone of the embodiment receives electronic mail. Referring to FIG. 4, when the mobile phone 10 receives electronic mail, the mail managing means 111d in the controller 111 is activated (S20). The mail managing means 111d judges whether the received electronic mail includes the display condition (S21). When the display condition is not added to the received electronic mail (NO in S21), the mail managing means 111d indicates that the received electronic mail can be displayed by showing a predetermined message on the display section 104, or, in addition, vibration of a vibrator or flashing of a light emitting section (S23). When the display condition is added to the received electronic mail (YES in S21), the mail managing means 111d further judges whether the added display condition is satisfied (S22). For example, when the display date and time is specified, a date and time indicated by the incorporated timer is referred to, and it is judged whether the date and time of the timer 109 matches the display condition. When it is judged from the result that the electronic mail can be displayed, the mail managing means 111d indicates by display of a message on the display section 104, vibration of the vibrator, and flashing of the light emitting section and the like that the received electronic mail can be displayed (S23). The electronic mail receiver can browse the received electronic mail at least once. On the other hand, when the date and time of the timer 109 do not match the display condition, display of the received electronic mail is prohibited until the date and time when display is permitted. When the display condition is satisfied, it is indicated as such. The method of prohibiting display of the electronic mail is a publicly-known method, for example, prohibiting reading out of electronic mail data retained in the memory 103.

Referring to FIG. 5, when the electronic mail receiver performs, for example, an operation of displaying an electronic mail received and saved, the mail managing means 111d of the controller 111 is activated (S24), and it is judged whether the electronic mail includes the condition concerning the number of times the electronic mail can be displayed (S25). When the condition concerning the number of displays is not added to the electronic mail, the mail managing means 111d displays the electronic mail on the display section 104 (S28). When the electronic mail includes the aforementioned condition (YES in S25), the mail managing means 111d further judges whether the accumulated number of times the electronic mail has been displayed exceeds the permitted number of displays (S26). When the accumulated number of times does not exceed the permitted number of displays, the contents of the specified electronic mail are displayed on the display section 104 (S28). When the accumulated number of times exceeds the permitted number of displays, the mail managing means 111d deletes the specified electronic mail from the memory 103 or prohibits display of the specified electronic mail (S27). The accumulated number of times each piece of electronic mail is displayed is associated with the electronic mail and stored in the memory 103. The operation shown in FIG. 5 can be periodically executed without any operation by the electronic mail receiver. In this case, electronic mail whose number of displays reaches the permitted number of displays is automatically deleted or prohibited from being displayed.

Referring to FIG. 6, the mail managing means 111d of the controller 111 periodically checks whether electronic mail stored in the memory 103 includes the saving condition (S29). The mail managing means 111d further judges whether the retention period of the electronic mail including the saving condition has expired (S30). The electronic mail whose retention period has expired is forcibly deleted from the memory 103 (S31).

Figure 7:
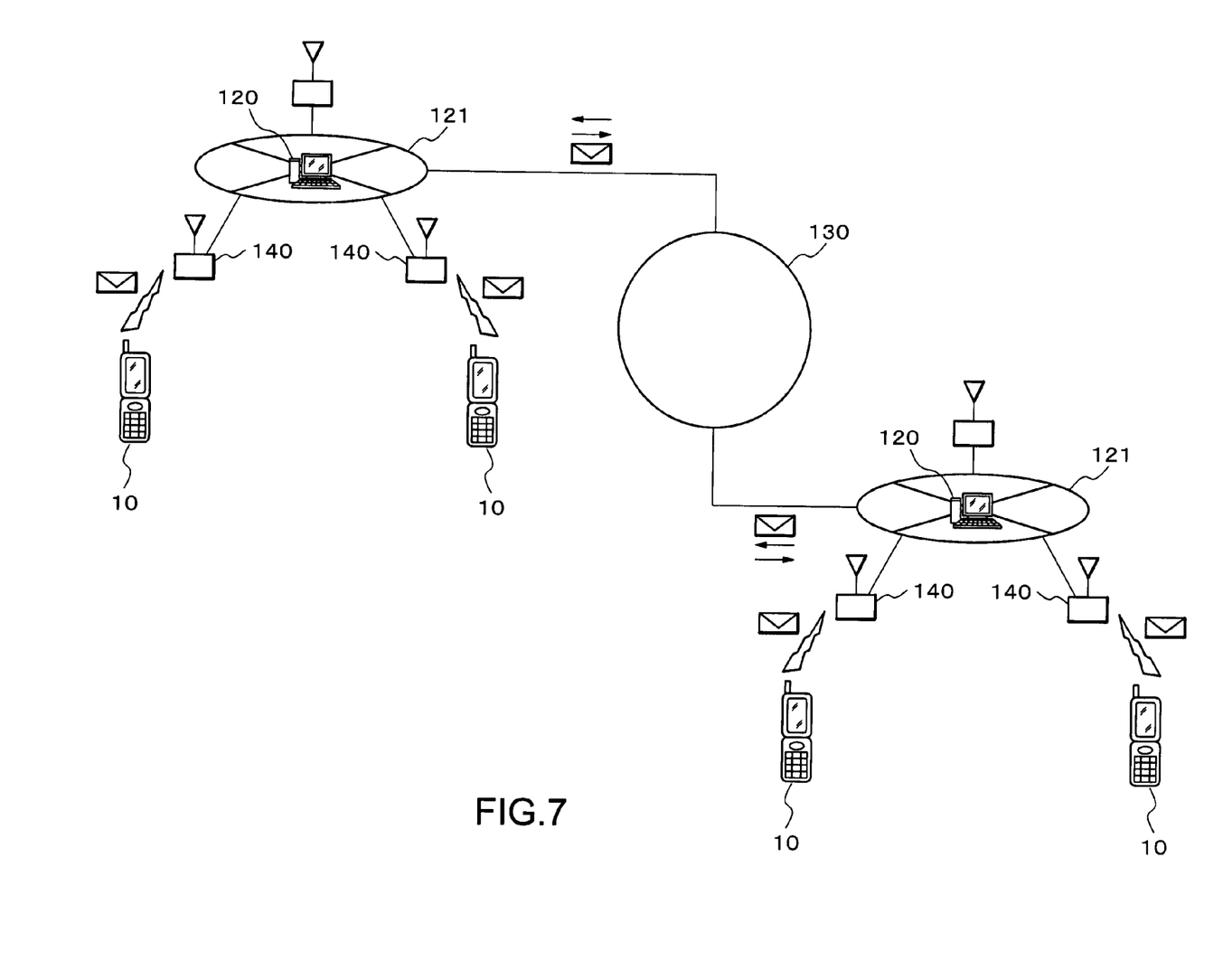
FIG. 7 shows a mobile communication system of the embodiment of the present invention.

FIG. 7 shows an example of a configuration of a mobile communication system using aforementioned mobile phones. In this system, a plurality of mobile communication networks 121 are connected to each other through the Internet 130. Each of the mobile communication networks 121 includes a mail server 120 and a plurality of base stations 140. The mail servers 120 and the base stations 140 implement publicly known operations. An electronic mail sender does input of electronic mail in the mobile phone 10 and further of predetermined additional conditions. The electronic mail received by the receiver is allowed or not allowed to be displayed or deleted according to the additional conditions in the receiver's mobile phone. The receiver of the electronic mail is restricted, according to the conditions added to the received electronic mail, the disposal of the electronic mail, other than deletion of the electronic mail.

The attaching means and electronic mail managing means are formed in a CPU within the mobile communication terminal. Operating programs for the means can be installed in a memory or the CPU in the terminal.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A mobile communication terminal for sending and receiving electronic mail, comprising:
   a memory and a controller for executing programs stored in the memory, wherein the program causes the controller to perform processes comprising:
      attaching, to an electronic mail to be sent, first management data for the electronic mail to be sent, and
      managing a received electronic mail according to second management data attached to the received electronic mail,
      wherein each of the first and second management data includes data concerning display including a date and time the received electronic mail is allowed to be displayed; and
   an own position determination unit, wherein the data concerning display comprises data concerning a position where the received electronic mail is allowed to be displayed,
   wherein each of the first and second management data further includes at least one of:
      in said data concerning display, a number of displays at which the received electronic mail is allowed to be displayed, and
      data concerning saving, including whether the received electronic mail is allowed to be saved, and
   wherein each of the first and second management data further comprises data concerning forwarding of the received electronic mail, including at least one of whether the received electronic mail is allowed to be forwarded and a number of times that the received electronic mail is allowed to be forwarded.

2. The mobile communication terminal according to claim 1, wherein the data concerning display further comprises a period the received electronic mail is allowed to be displayed.

3. The mobile communication terminal according to claim 1, wherein the data concerning saving further comprises at least one of information on whether the received electronic mail is allowed to be saved and a period the saved electronic mail is allowed to be retained.

4. The mobile communication terminal according to claim 3, wherein when a saved period of the received electronic mail exceeds the allowed retention period in the data concerning saving, the controller deletes the received electronic mail.

5. The mobile communication terminal according to claim 1, wherein the controller comprises a CPU within the mobile communication terminal.

6. The mobile communication terminal according to claim 1, wherein display of the received electronic mail is prohibited until a permission time based on said data concerning display.

7. A mobile communication system in which an electronic mail is sent and received, comprising:
   a plurality of mobile communication terminals;
   a base station; and
   a mobile communication network, wherein each of the mobile communication terminals includes:
      attaching means for attaching, to an electronic mail to be sent, first management data for the electronic mail to be sent;
      electronic mail managing means for managing a received electronic mail according to second management data attached to the received electronic mail, wherein each of the first and second management data includes data concerning display including a date and time the received electronic mail is allowed to be displayed; and
      an own position determination unit, wherein the data concerning display comprises data concerning a position where the received electronic mail is allowed to be displayed,
      wherein each of the first and second management data further includes at least one of:
         in said data concerning display, a number of displays at which the received electronic mail is allowed to be displayed, and
         data concerning saving, including whether the received electronic mail is allowed to be saved, and
      wherein each of the first and second management data further comprises data concerning forwarding of the received electronic mail, including at least one of whether the received electronic mail is allowed to be forwarded and a number of times that the received electronic mail is allowed to be forwarded.

8. The mobile communication system according to claim 7, wherein each of the first and second management data further comprises data concerning forwarding of received electronic mail.

9. The mobile communication system according to claim 7, wherein display of the received electronic mail is prohibited until a permission time based on said data concerning display.

10. An electronic mail managing method, for managing electronic mail in a communication terminal, comprising:
   a controller in said communication terminal attaching to an electronic mail to be sent first management data for the electronic mail to be sent;
   the controller controlling a received electronic mail according to second management data attached to the received electronic mail, wherein each of the first and second management data includes data concerning display including a date and time the received electronic mail is allowed to be displayed; and the controller determining an own position, wherein the data concerning display comprises data concerning a position where the received electronic mail is allowed to be displayed, wherein each of the first and second management data further includes at least one of:

in said data concerning display a number of displays at which the received electronic mail is allowed to be displayed, and data concerning saving including whether the received electronic mail is allowed to be saved, and wherein each of the first and second management data further comprises data concerning forwarding of the received electronic mail, including at least one of whether the received electronic mail is allowed to be forwarded and a number of times that the received electronic mail is allowed to be forwarded.

11. The electronic mail managing method according to claim 10, wherein each of the first and second management data further comprises data concerning forwarding of the received electronic mail.

12. The electronic mail managing method according to claim 10, wherein the data concerning display further comprises a period the received electronic mail is allowed to be displayed.

13. The electronic mail managing method according to claim 11, wherein the data concerning saving further comprises at least one of information on whether the received electronic mail is allowed to be saved and a period the saved electronic mail is allowed to be retained.

14. The electronic mail managing method according to claim 13, further comprising: deleting the received electronic mail, when a saved period of the received electronic mail exceeds the allowed retention period in the data concerning saving.

15. The electronic mail managing method according to claim 10, further comprising: prohibiting display of the received electronic mail until a permission time based on said data concerning display.

* * * * *